United States Patent
Xia et al.

(10) Patent No.: US 8,040,116 B2
(45) Date of Patent: Oct. 18, 2011

(54) AUTOMATICALLY CONFIGURABLE DUAL REGULATOR TYPE CIRCUITS AND METHODS

(75) Inventors: Degang Xia, Allen, TX (US); Chuan Ni, Allen, TX (US); Matthew Alan Frank, Mesquite, TX (US)

(73) Assignee: Texas Instruments Incorporated, Dallas, TX (US)

( * ) Notice: Subject to any disclaimer, the term of this patent is extended or adjusted under 35 U.S.C. 154(b) by 167 days.

(21) Appl. No.: 12/402,171

(22) Filed: Mar. 11, 2009

(65) Prior Publication Data
US 2009/0309559 A1    Dec. 17, 2009

Related U.S. Application Data

(60) Provisional application No. 61/073,307, filed on Jun. 17, 2008.

(51) Int. Cl.
*G05F 1/00* (2006.01)
(52) U.S. Cl. .......................... 323/271; 323/272
(58) Field of Classification Search .................. 323/234, 323/265, 271, 272, 273, 282, 284, 274
See application file for complete search history.

(56) References Cited

U.S. PATENT DOCUMENTS

| | | | | |
|---|---|---|---|---|
| 7,148,607 B2* | 12/2006 | Sato | ............................ | 310/334 |
| 7,812,580 B2* | 10/2010 | Watanabe et al. | ............. | 323/268 |
| 2005/0088856 A1* | 4/2005 | Yamamoto et al. | ............. | 363/19 |
| 2007/0279024 A1* | 12/2007 | Falvey et al. | .................. | 323/280 |

* cited by examiner

*Primary Examiner* — Adolf Berhane
*Assistant Examiner* — Nguyen Tran
(74) *Attorney, Agent, or Firm* — Dawn W. Stephens; Wade James Brady, III; Frederick J. Telecky, Jr.

(57) ABSTRACT

Automatically configurable dual regulator type circuits and methods are provided. On embodiment of the invention includes an automatically configurable dual regulator type circuit. The circuit comprises a high-side switching device (HS-SD) coupled to a low-side switching device (LS-SD) at an output node. The circuit further comprises a control logic device that turns on the HS-SD to provide an output current to a user selected circuit configuration through the output node, turns off the HS-SD after a voltage fed back from an output terminal of the user selected circuit configuration exceeds a first threshold and sets a regulator type configuration mode based on the presence or absence of a flyback period at the output node after the HS-SD has been turned off.

13 Claims, 5 Drawing Sheets

Linear Regulator

Switching Regulator

AUTOMATICALLY CONFIGURABLE DUAL REGULATOR TYPE CIRCUITS AND METHODS

RELATED APPLICATIONS

The present application claims priority from U.S. Provisional Patent Application Ser. No. 61/073,307 filed Jun. 17, 2008.

TECHNICAL FIELD

This invention relates to electronic circuits, and more specifically to automatically configurable dual regulator type circuits and methods.

BACKGROUND

A switching regulator typically employs a high-side metal-oxide semiconductor field effect transistor (MOSFET) (HS FET) and a low-side MOSFET (LS FET) to switch power between the HS FET and LS FET by a switching control signal and to provide current to an output inductor. In other cases, the MOSFETs can be replaced with bipolar transistors or other switching/linear pass devices. The switching regulator typically employs feedback of the output to an error amplifier where the feedback is compared to a stable reference voltage to maintain a constant output voltage. If the output voltage falls below or rises above the reference voltage, the switching frequency and/or duty cycle of the switching signal varies so as to maintain a constant output voltage. A low-dropout (LDO) regulator is a DC linear voltage regulator which can operate with a very small input-output differential voltage. The main components are a power FET and a differential amplifier (error amplifier). One input of the differential amplifier monitors a percentage of the output and the second input to the differential amplifier is from a stable voltage reference (bandgap reference). If the output voltage falls below or rises above the reference voltage, the drive voltage to the power FET changes so as to maintain a constant output voltage.

LDO regulators and switching regulators are widely used in integrated circuits (ICs). An LDO regulator may not be very power efficient but can have substantially low system implementation costs. A switching regulator can be power efficient, but because the circuit requires an inductor, it will be more expensive than an LDO regulator and need more printed circuit board (PCB) area than an LDO regulator. From a cost perspective, an LDO and a switching regulator would not likely be fabricated on the same IC chip. Also there are pin limitations to implementing both an LDO regulator and a switching regulator on the same IC chip. However, in certain situations, in certain applications, it is desirable to have a dual regulator type circuit that allows for configuring the dual regulator type circuit as either an LDO or a switching regulator. For example, some applications may require an LDO regulator for lower system cost and better noise performance, while other applications may require a switching regulator to have better power efficiency, especially in battery powered implementations. Usually an IC with a dual regulator needs an additional pin that can be used to define a particular mode of the regulator. This pin is either pulled to a particular voltage or connected to ground to define the setting. However, this implementation increases IC chip pin outs and costs.

SUMMARY

In one aspect of the invention, an automatically configurable dual regulator type circuit is provided. The circuit comprises a high-side switching device (HS-SD) coupled to a low-side switching device (LS-SD) at an output node. The circuit further comprises a control logic device that turns on the switching device to provide an output current to a user selected circuit configuration through the output node, turns off the switching device after a voltage fed back from an output terminal of the user selected circuit configuration exceeds a first threshold and sets a regulator type configuration mode based on the presence or absence of a flyback period at the output node after the HS-SD has been turned off.

In yet another aspect of the invention, an automatically configurable dual regulator type circuit is provided that has a HS-SD coupled to a LS-SD at an output node. The circuit comprises means for turning on the HS-SD to provide an output current to a user selected circuit configuration through the output node, means for determining if the voltage at an output terminal of the user selected circuit configuration has exceeded a first threshold and means for turning off the HS-SD if the voltage at the output terminal has exceeded the first threshold. The circuit further comprises means for determining the presence or absence of a flyback period after the turning off of the HS-SD and means for setting a regulator type configuration mode based on the presence or absence of the flyback period.

In yet a further aspect of the invention, a method of automatically configuring a dual regulator type circuit is provided having a HS-SD coupled to a LS-SD at an output node. The method comprises providing a user selected circuit configuration at an output pin coupled to the output node and an output terminal of the user selected configuration coupled to a feedback pin of the dual regulator type circuit. The method comprises turning on the HS-SD to provide an output current to the user selected circuit configuration through the output node, turning off the HS-SD if the voltage at the feedback pin has exceeded a first threshold, determining whether or not the voltage at the output pin falls below the voltage at the feedback pin after the turning off of the HS-SD and setting a regulator type configuration mode based on the determination.

DETAILED DESCRIPTION

The present invention relates to electronics, and more specifically to an automatically configurable dual regulator type circuit and method. The circuit and method automatically configure a dual regulator type circuit between a switching regulator configuration and a low dropout regulator configuration. The circuit and method automatically detect the presence or absence of an inductor by determining if an output node of the dual regulator circuit has experienced a negative voltage drop, referred to as flyback. The circuit and method detect the presence and absence of an inductor by using only an output pin (PH) and a feedback pin (VA). There is no extra pin needed to determine the desired configuration. The circuit and method then reset the dual regulator type circuit and configure the dual regulator type circuit as either a switching regulator or an LDO regulator based on the determined presence or absence of flyback.

Figures 1, 2:
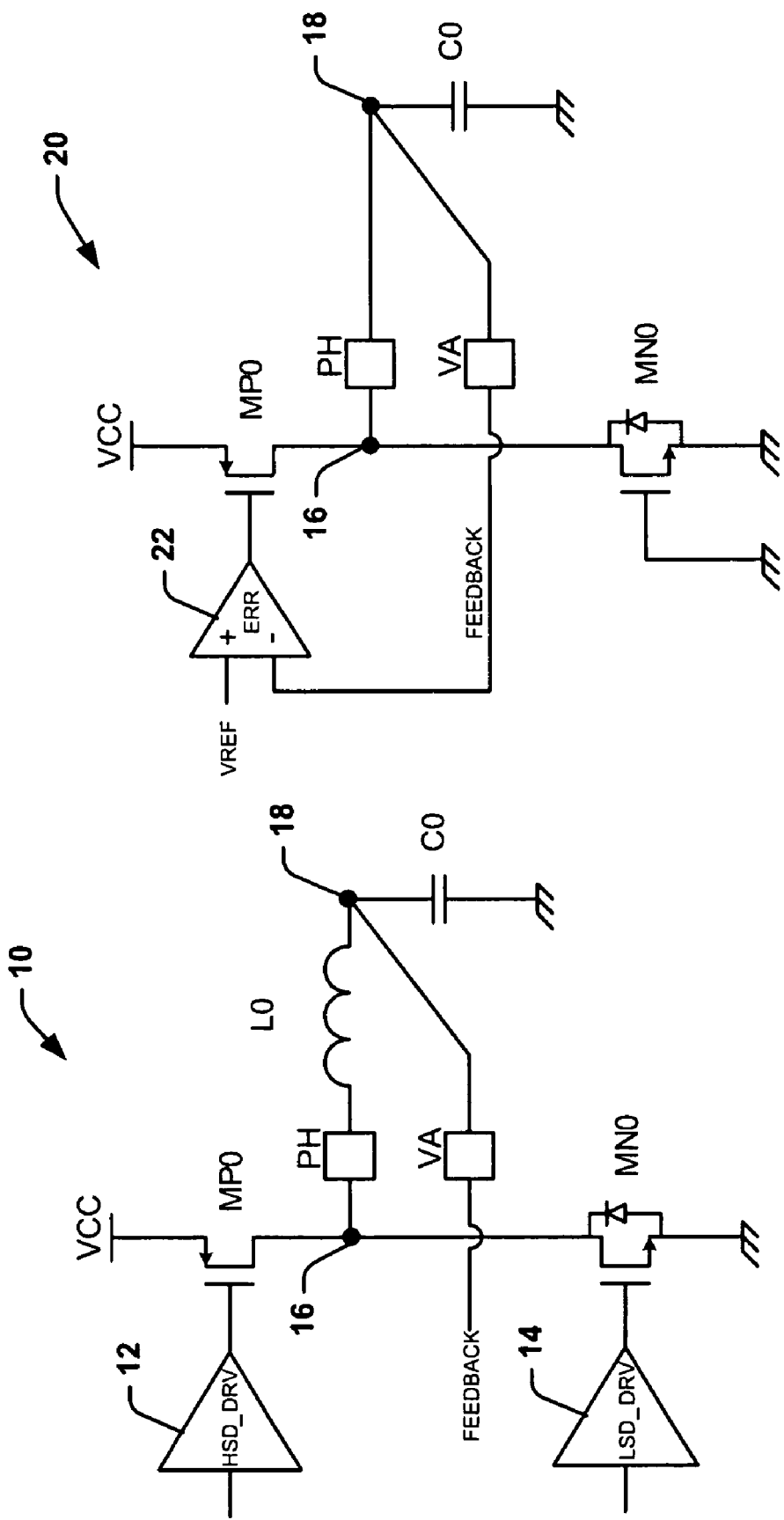
FIG. 1 illustrates components of a dual regulator type circuit employed in a switching regulator configuration in accordance with an aspect of the present invention.
FIG. 2 illustrates components of the dual regulator type circuit employed in an LDO configuration in accordance with an aspect of the present invention.

FIG. 1 illustrates the components of a dual regulator type circuit employed in a switching regulator configuration 10 in accordance with an aspect of the present invention. The switching regulator configuration 10 includes series coupled high-side PMOS FET (MP0) (HS FET) and low-side NMOS FET (MN0) (LS FET) driven by respective high-side driver 12 and low-side driver 14 via, for example, two switching signals. It is to be appreciated that the HS FET and the LS FET can be replaced with bipolar transistors or other switching/linear pass devices based on a desired implementation. An output node 16 is coupled to an output pin (PH), which is coupled to a first end of an inductor L0. A second end of the inductor is coupled to an output terminal 18, which is coupled to an output capacitor C0 to ground. A feedback signal of the output terminal 18 is fed back through a feedback pin (VA) to an error amplifier (not shown) to provide a regulated output voltage at the output terminal 18. MP0 and MN0 are two relatively big power devices that normally account for more than 50% of switching regulator circuit die area. When the dual regulator type circuit is configured as a switching regulator configuration, MP0 and MN0 are both used for synchronous rectification.

FIG. 2 illustrates the components of the dual regulator type circuit employed in an LDO configuration 20 in accordance with an aspect of the present invention. The LDO configuration 20 includes PMOS FET MP0 and an error amplifier 22 that drives MP0. The output node 16 is coupled to the output pin (PH), which is coupled to the output terminal 18. The output terminal 18 is coupled to the output capacitor 18 to ground. A feedback signal of the output terminal 18 is fed back through the feedback pin (VA) to the error amplifier 22 to provide a regulated output voltage at the output terminal 18. When the dual regulator type circuit is configured as an LDO, MP0 will be used as a passive power device while MN0 is turned off. As MP0 is shared for both types of regulators, about 33% of regulator die area is saved assuming the PMOS device is 2 times the size of NMOS for the same on-impedance ($R_{dson}$).

Figure 3:
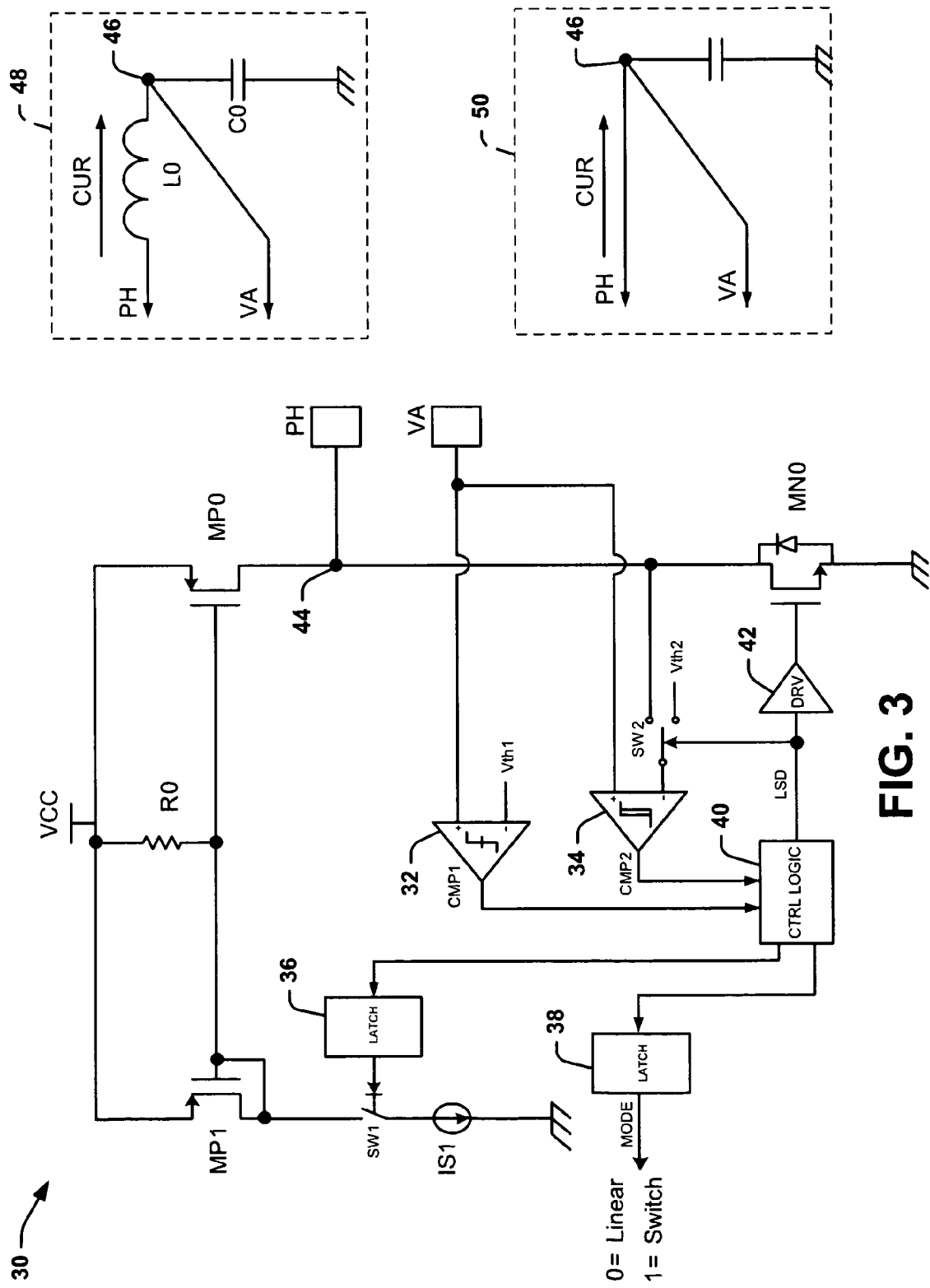
FIG. 3 illustrates an automatically configurable dual regulator type circuit in accordance with an aspect of the invention.

FIG. 3 illustrates an automatically configurable dual regulator type circuit 30 in accordance with an aspect of the invention. The dual regulator type circuit 30 can be fabricated in a single integrated circuit (IC) chip. The dual regulator type circuit 30 includes series coupled high-side PMOS FET (MP0) (HS FET) and low-side NMOS FET (MN0) (LS FET) coupled between a supply voltage (VCC) and ground. An output node 44 between MP0 and MN0 is coupled to an output pin (PH). In a switching regulator configuration 48, PH is coupled to a first end of an inductor L0. A second end of the inductor L0 is coupled to an output terminal 46, which is coupled to an output capacitor C0 to ground. A feedback signal of the output terminal 46 is fed back through a feedback pin (VA). In an LDO regulator configuration 50, PH is coupled to an output terminal 46, which is coupled to an output capacitor C0 to ground. A feedback signal of the output terminal 46 is fed back through the feedback pin (VA).

VA is coupled to a positive input terminal of a first comparator 32 and a positive input terminal of a second comparator 34. A first threshold voltage (Vth1) is coupled to a negative input terminal of the first comparator 32. The output node 44 is coupled to a switch SW2, which is switchable between providing the output node voltage (PH) and a second threshold voltage (Vth2) to a negative input terminal of the second comparator 34. An output of the first comparator 32 is provided to a control logic unit 40 and the output of the second comparator 34 is provided to the control logic unit 40. The control logic unit 40 provides a low-side drive (LSD) signal that controls the switching of SW2 and turning on and off of MN0 through a driver 42. The control logic unit 40 provides two set/reset signals to a first latch 36 and a second latch 38, respectively. A diode coupled PMOS MP1 is current mirror coupled with MP0 via a switch SW1 and a current source IS1 with a resistor R0 being coupled to VCC and the gates of MP1 and MP0. The output of the first latch 36 is configured to turn on/off SW1 and the output of the second latch 38 is configured to provide the detected regulator type configuration mode (0=Linear, 1=Switch).

Figure 4:
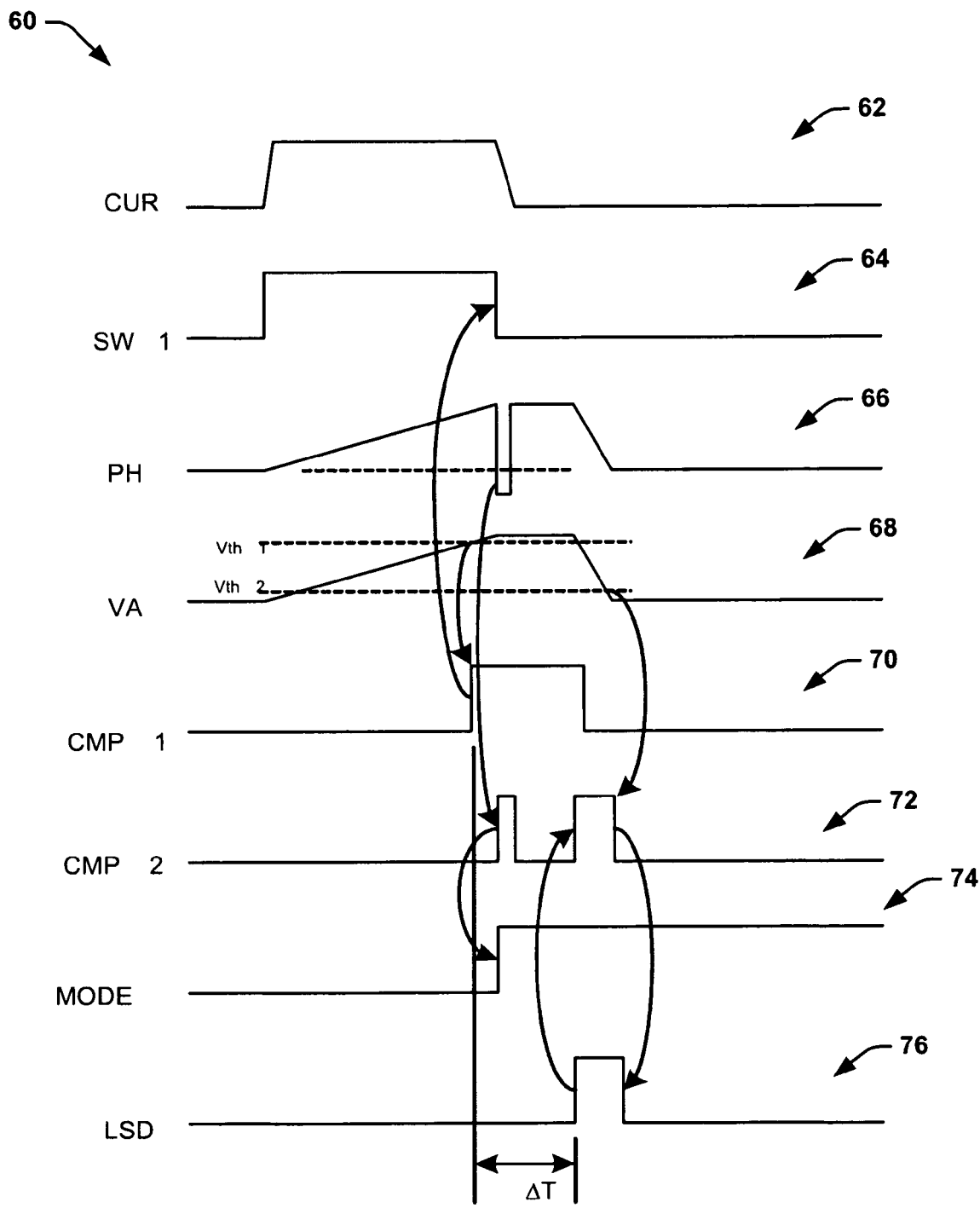
FIG. 4 illustrates a set of waveforms associated with the automatic configuration operation of the dual regulator type circuit in a switching regulator configuration in accordance with an aspect of the invention.

FIG. 4 illustrates a set of waveforms 60 associated with the automatic configuration operation of the dual regulator type circuit 30 of FIG. 3 in the switching regulator configuration 48 (i.e., if a user couples an inductor and output capacitor to the output pin (PH) as illustrated in 48). When configuration detection is enabled, for example, after power up, the SW1 is turned on by the control logic unit 40 through latch 36 as illustrated in a switch 1 waveform (SW1) 64. The current source IS1 then turns on the MP1. As a result, MP0 conducts some amount of current to charge the inductor L0 and provide inductor current as illustrated in a current waveform (CUR) 62, as well as to charge the output capacitor C0. As illustrated in an output pin waveform (PH) 66 and a feedback pin waveform (VA) 68, the voltage at the output node 44 and the output terminal 46 begin to increase as a result of the inductor current and charging of the output capacitor C0. 'VA' is the output terminal voltage, as well as the feedback voltage. When 'VA' exceeds the first threshold voltage $V_{th1}$, where $V_{th1}$ is a predetermined voltage which should be smaller than an under voltage lockout (UVLO) of the circuit or chip which is powered by the configurable dual regulator to avoid false power up, the first comparator 32 trips and the output goes high, as illustrated in a first comparator waveform (CMP 1) 70. The output of the first comparator 32 is then sensed by the control logic unit 40 and outputs a signal low to turn off SW1. After SW1 is off, the pull up resistor R0 pulls the gate of MP0 to VCC to turn MP0 off.

As a result of MP0 being turned off, the current in the inductor L0 decays and fly-back occurs to turn on the body diode of MN0. The 'PH' pin falls below ground for a short time during the fly-back period as illustrated in the output pin waveform (PH) 66. This causes the PH voltage to fall below the feedback voltage VA tripping the second comparator 34, such that the output of the second comparator 34 goes high as illustrated in a second comparator waveform (CMP 2) 72. The output of the second comparator 34 is then sensed by the control logic unit 40 and latched to the MODE node to set the detected desired regulator type configuration mode. After a predetermined delay (ΔT) with respect to the rising edge of the first comparator waveform (CMP 1) 70, the control logic 40 sets the LSD signal high as illustrated in a low-side drive (LSD) signal waveform 76. LSD goes high and switches the negative input terminal of second comparator 34 from 'PH' to $V_{th2}$ (which can be a threshold voltage a little greater than ground) via SW2. As a result, the CMP2 goes high as illustrated in the second comparator waveform (CMP 2) 72. LSD high turns on MN0 and discharges the capacitor C0 to ground. When VA is discharged below $V_{th2}$, the output of the second comparator 34 goes low and resets the LSD signal through the control logic 40 to turn off MN0. Thereby, the mode detection cycle is finished and MODE is logic "1" which indicates an inductor exists and the automatically configurable dual regulator type circuit can be configured as a switching regulator.

Figure 5:
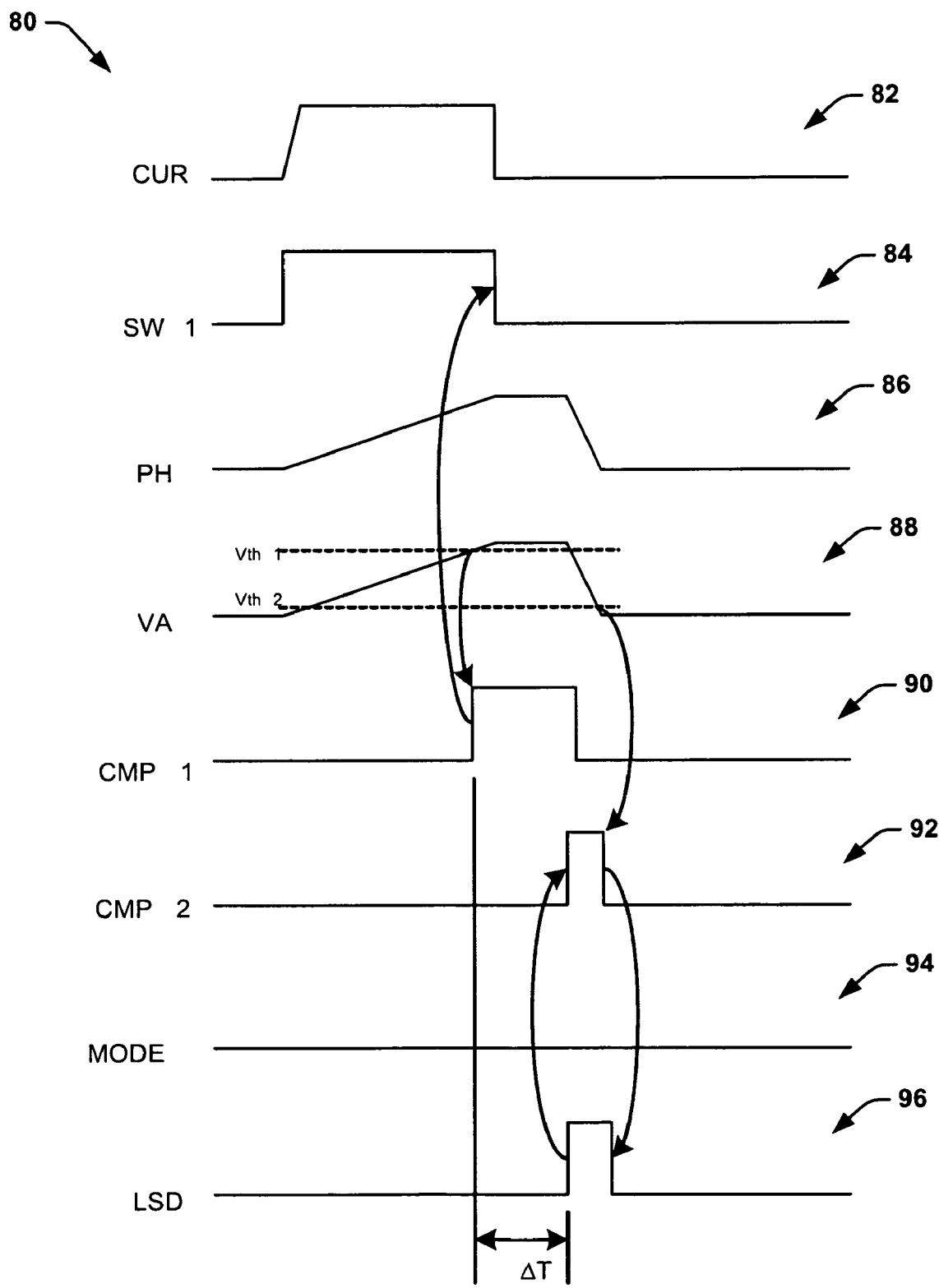
FIG. 5 illustrates a set of waveforms associated with the automatic configuration operation of the dual regulator type circuit in an LDO regulator configuration in accordance with an aspect of the invention.

FIG. 5 illustrates a set of waveforms 80 associated with the automatic configuration operation of the dual regulator type circuit 30 of FIG. 3 in the LDO regulator configuration 50 (i.e., if a user couples an output capacitor to the output pin (PH) as illustrated in 50 without an inductor). When configuration detection is enabled, for example, after power up, the SW1 is turned on as illustrated in a switch 1 waveform (SW 1) 84. The current source IS1 then turns on the MP1. As a result, MP0 conducts some amount of current to charge the output capacitor C0 as illustrated in a current waveform (CUR) 82. As illustrated in an output pin waveform (PH) 86 and a feedback pin waveform (VA) 88, the voltage at the output node 44 and the output terminal 46 begin to increase as a result of the charging of the output capacitor C0. When 'VA' reached the first threshold voltage $V_{th1}$, the first comparator 32 trips and the output goes high, as illustrated in a first comparator waveform (CMP 1) 90. The output of the first comparator 32 is then sensed by the control logic unit 40 and outputs a signal low to turn off SW1. After SW1 is off, the pull up resistor R0 pulls the gate of MP0 to VCC to turn MP0 off and the current decays to zero substantially instantaneously as illustrated the current waveform (CUR) 82.

Since there is no inductor, the 'PH' pin and the VA pin stay at substantially the same voltage and there is no flyback period as illustrated in the output pin waveform (PH) 86 and the feedback pin waveform (VA) 88. Therefore, the second comparator 34 does not trip, such that the output of the second comparator 34 stays low as illustrated in a second comparator waveform (CMP 2) 92. It is to be appreciated that the second comparator 34 can be a hysteretic comparator to mitigate false flyback due to inherent inductance of the bonding wire and circuit traces. The output of the second comparator 34 is then sensed by control logic unit 40 and latched to the MODE node to set the detected desired regulator type configuration mode. After a predetermined delay ($\Delta T$) with respect to the rising edge of the first comparator waveform (CMP 1) 90, the control logic 40 sets the LSD signal high as illustrated in a low-side drive (LSD) signal waveform 96. LSD goes high and switches the negative input terminal of second comparator 34 from 'PH' to $V_{th2}$. As a result, the CMP2 goes high as illustrated in the second comparator waveform (CMP 2) 92. LSD high turns on MN0 and discharges the capacitor C0 to ground. When VA is discharged below $V_{th2}$, the output of the second comparator 34 goes low and resets the LSD signal through the control logic 40 to turn off MN0. Thereby the mode detection cycle is finished and MODE is logic "0" to indicate that there is no inductor and the automatically configurable dual regulator type circuit 30 can be configured as an LDO regulator.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., analog or digital circuitry, such as may be embodied in an application specific integrated circuit), software (e.g., as executable instructions stored in memory or running on a processor implemented in an ASIC), or any combination of hardware and software.

Figure 6:
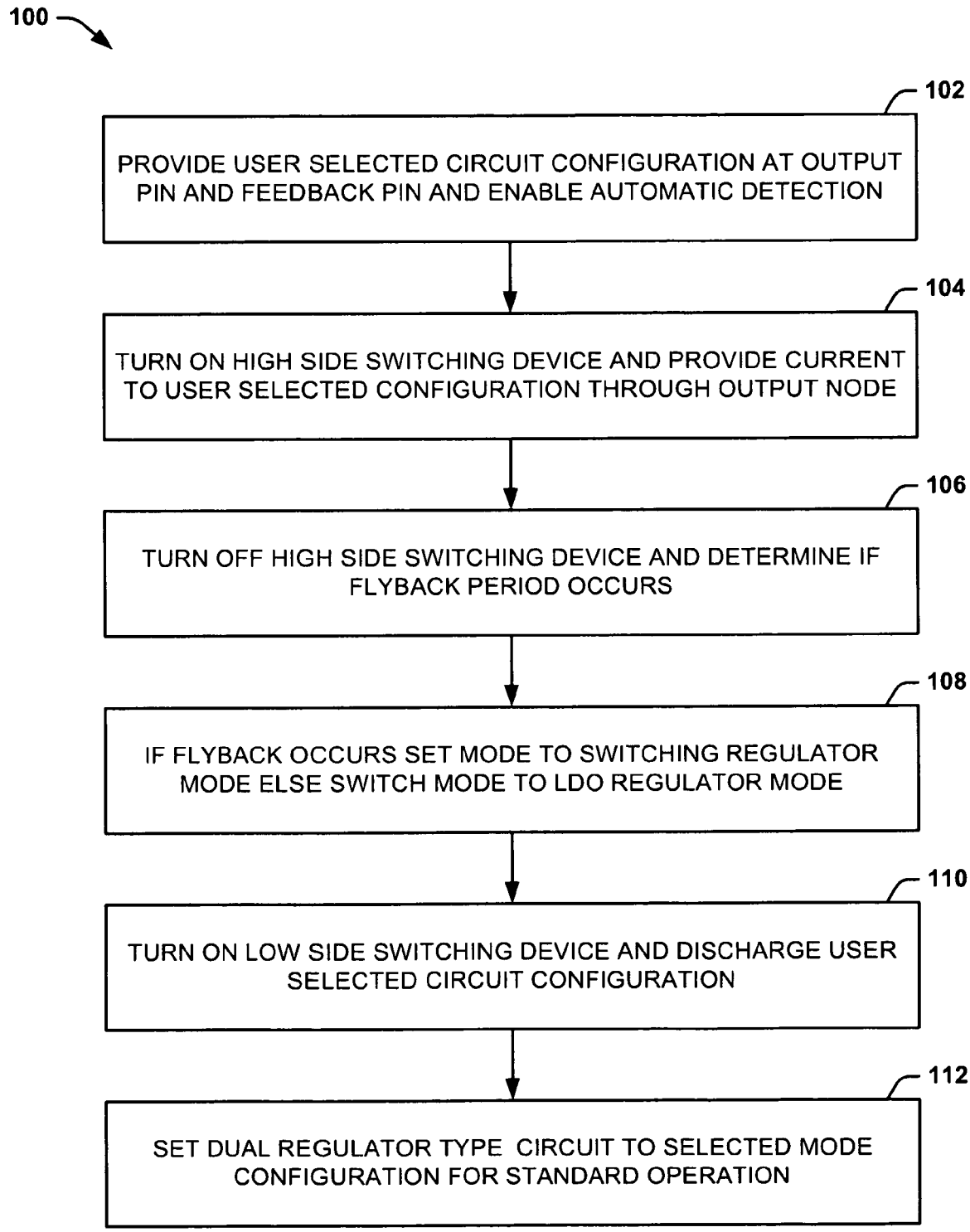
FIG. 6 illustrates an example of a method for automatically configuring a dual regulator type circuit in accordance with an aspect of the invention.

FIG. 6 illustrates an example of a method 100 for automatically configuring a dual regulator type circuit in accordance with an aspect of the invention. The dual regulator type circuit is automatically configurable between a switching regulator configuration and an LDO configuration based on a user selected circuit configuration at an output node of the dual regulator type circuit. For example, a user selected circuit configuration can be provided at an output pin coupled to the output node and an output terminal of the user selected configuration coupled to a feedback pin of the dual regulator type circuit. The method 100 begins at 102 where a user selected circuit configuration is provided at an output pin of the dual regulator type circuit and automatic detection is enabled, for example, by powering up the dual regulator type circuit. The user selected configuration can include an inductor and output capacitor (e.g., switching regulator configuration) or an output capacitor with no inductor (e.g., LDO regulator configuration). At 104, a HS-SD is turned on to provide current to the user selected circuit configuration through the output node of the dual regulator type circuit. At 108, the HS-SD is turned off and it is determined whether or not a flyback period has occurred.

A flyback period occurs if a negative voltage occurs at the output node due the presence of an inductor when the dual regulator type circuit is configured as a switching regulator due to the inductor drawing current through a body diode of a LS-SD upon the HS-SD being turned off. A flyback period does not occur if a negative voltage does not occur at the output node due the lack of presence of an inductor when the dual regulator type circuit is configured as an LDO regulator. At 108, a mode is set to a switching regulator configuration if flyback occurs or to an LDO regulator configuration if flyback does not occur. At 110, the LS-SD is turned on to discharge the user selected circuit configuration. At 112, the dual regulator type circuit is set to the selected mode for standard operation.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An automatically configurable dual regulator type circuit comprising:
   a high-side switching device (HS-SD) coupled to a low-side switching device (LS-SD) at an output node; and
   a control logic device that turns on the HS-SD to provide an output current to a user selected circuit configuration through the output node, turns off the HS-SD after a voltage fed back from an output terminal of the user selected circuit configuration exceeds a first threshold and sets a regulator type configuration mode based on the presence or absence of a flyback period at the output node after the HS-SD has been turned off,
   wherein the HS-SD and the LS-SD are both used in one regulator type configuration mode, and
   wherein the control logic device discharges the output user selected circuit configuration, after a predetermined delay of the voltage of the output terminal exceeding the first threshold, by turning on the LS-SD until the voltage of the output terminal falls below a second threshold.

2. The circuit of claim 1, wherein the user selected circuit configuration comprises one of a switching regulator configuration that includes an inductor and a low dropout (LDO) regulator configuration that does not include an inductor.

3. The circuit of claim 1, wherein the regulator type configuration mode is set to a switching regulator configuration if a flyback period is detected and a low dropout (LDO) regulator configuration if a flyback period is not detected.

4. The circuit of claim 3, wherein a flyback period is detected if the voltage at the output node falls below the voltage at the output terminal due to current flowing through the body diode of the LS-SD and through an inductor in the user selected circuit configuration.

5. The circuit of claim 4, further comprising a comparator that switches states if the voltage at the output node falls below the voltage at the output terminal.

6. The circuit of claim 5, further comprising a latch that is latched by the control logic device to latch the state of the comparator during the absence or presence of a flyback period to set the regulator type configuration mode.

7. The circuit of claim 5, wherein the control logic device discharges the output user selected circuit configuration, after a predetermined delay of the voltage of the output terminal exceeding the first threshold, by turning on the LS-SD until the voltage of the output terminal falls below a second threshold.

8. The circuit of claim 7, wherein the comparator switches between comparing the voltage of the output terminal with the voltage at the output node during regulator type configuration mode determination and the second threshold during discharging.

9. The circuit of claim 1, further comprising a diode coupled FET that is current mirror coupled with the HS-SD, the diode coupled FET being series coupled to a current source through a switch that switches on to turn on the diode coupled FET and the HS-SD and turns off to turn off the diode coupled FET and the HS-SD.

10. The circuit of claim 9, further comprising:
a comparator that switches states if the voltage of the output node exceeds the first threshold, which is a predetermined voltage which should be smaller than an under voltage lockout (UVLO) of a circuit or a chip which is powered by the configurable dual regulator circuit to avoid false power up; and
a latch that is latched by the control logic device to latch the state of the comparator upon the voltage of the output node exceeding the first threshold, such that the latch turns the switch off to turn off the diode coupled FET and the HS-SD.

11. An integrated circuit chip comprising the following circuit:
an automatically configurable dual regulator type circuit comprising:
a high-side switching device (HS-SD) coupled to a low-side switching device (LS-SD) at an output node;
a control logic device that turns on the HS-SD to provide an output current to a user selected circuit configuration through the output node turns off the HS-SD after a voltage fed back from an output terminal of the user selected circuit configuration exceeds a first threshold and sets a regulator type configuration mode based on the presence or absence of a flyback period at the output node after the HS-SD has been turned off,
wherein the HS-SD and the LS-SD are both used in one regulator type configuration mode; and
further comprising means for turning on the LS-SD until the voltage of the output terminal falls below a second threshold to discharge the user selected circuit configuration after a predetermined delay of the voltage of the output terminal exceeding the first threshold.

12. The circuit of claim 11, wherein the user selected circuit configuration comprises one of a switching regulator configuration that includes an inductor and a low dropout (LDO) regulator configuration that does not include an inductor and wherein the regulator type configuration mode is set to a switching regulator configuration if a flyback period is detected and an LDO regulator configuration if a flyback period is not detected.

13. The circuit of claim 12, wherein a flyback period is detected if the voltage at the output node falls below the voltage at the output terminal due to current flowing through the body diode of the LS-SD and through an inductor in the user selected circuit configuration.

* * * * *